US007904700B2

(12) United States Patent
Mejdrich et al.

(10) Patent No.: US 7,904,700 B2
(45) Date of Patent: *Mar. 8, 2011

(54) PROCESSING UNIT INCORPORATING SPECIAL PURPOSE REGISTER FOR USE WITH INSTRUCTION-BASED PERSISTENT VECTOR MULTIPLEXER CONTROL

(75) Inventors: Eric Oliver Mejdrich, Rochester, MN (US); Adam James Muff, Rochester, MN (US); Robert Allen Shearer, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/045,222

(22) Filed: Mar. 10, 2008

(65) Prior Publication Data
US 2009/0228682 A1    Sep. 10, 2009

(51) Int. Cl.
G06F 9/00    (2006.01)
(52) U.S. Cl. .......................................... 712/222; 712/300
(58) Field of Classification Search .................. 712/222, 712/300
See application file for complete search history.

(56) References Cited

U.S. PATENT DOCUMENTS

| 6,141,673 | A  | * | 10/2000 | Thayer et al. ................. 708/402 |
| 2003/0018737 | A1 | * | 1/2003 | Buhlman et al. ............. 709/213 |
| 2005/0198473 | A1 |   | 9/2005 | Ford |
| 2006/0015705 | A1 |   | 1/2006 | Raubuch |
| 2006/0227966 | A1 |   | 10/2006 | Knowles |
| 2007/0013704 | A1 | * | 1/2007 | MacWilliams et al. ....... 345/542 |
| 2008/0148029 | A1 | * | 6/2008 | Luc et al. ...................... 712/300 |
| 2009/0228681 | A1 |   | 9/2009 | Mejdrich et al. |
| 2010/0106940 | A1 |   | 4/2010 | Muff et al. |

OTHER PUBLICATIONS

U.S. Patent and Trademark Office, Office Action issued in related U.S. Appl. No. 12/045,221, dated May 18, 2010.
U.S. Patent and Trademark Office, Office Action issued in related U.S. Appl. No. 12/256,550, dated Jan. 28, 2010.
U.S. Patent and Trademark Office, Notice of Allowance issued in related U.S. Appl. No. 12/256,550, dated Jun. 1, 2010.

* cited by examiner

*Primary Examiner* — Eddie P Chan
*Assistant Examiner* — William B Partridge
(74) *Attorney, Agent, or Firm* — Wood, Herron & Evans, LLP

(57) ABSTRACT

A software-accessible special purpose register is architected into a processing unit in order to implement persistent vector multiplexer control of a vector-based execution unit. A persistent swizzle instruction is defined in an instruction set for the vector-based execution unit and is used to cause state information to be stored in the special purpose register such that the operand vectors processed by subsequent vector instructions executed by the vector-based execution unit will be selectively shuffled using the persisted state information. As a result, when multiple vector instructions require a common custom word ordering for one or more operand vectors, a single persistent swizzle instruction may be used to select the desired custom word ordering for all of the vector instructions.

24 Claims, 9 Drawing Sheets

PROCESSING UNIT INCORPORATING SPECIAL PURPOSE REGISTER FOR USE WITH INSTRUCTION-BASED PERSISTENT VECTOR MULTIPLEXER CONTROL

CROSS-REFERENCE TO RELATED APPLICATIONS

This application is related to U.S. patent application Ser. No. 12/045,221, filed on even date herewith by Mejdrich et al. and entitled "PROCESSING UNIT INCORPORATING INSTRUCTION-BASED PERSISTENT VECTOR MULTIPLEXER CONTROL" (ROC920070533US1), the entire disclosure of which is incorporated by reference herein.

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector.

The aforementioned techniques may also be combined, resulting in a multithreaded vector execution unit architecture that enables multiple threads to issue SIMD instructions to a vector execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

It has been found that with vector execution units, it is often desirable to provide support for programmatically shuffling, or permuting, individual elements in a vector operand for certain types of arithmetic operations. For example, in the area of 3D image processing, backface culling can often be accelerated through the use of vector permutation. Backface culling is the process of determining which triangles that make up a 3D object face the camera, and thus, are visible in a scene. Determining which triangles are visible allows the computer graphics software to spend most of its time dealing with only visible faces of objects, such that performance can be maximized. As an example, with any 3D cube, having six faces, at most three faces will be visible from any given camera position, so it is known that at least three faces will not be visible in a scene and can be ignored from the standpoint of later graphical operations such as applying textures to the faces.

To determine if a surface of an object is facing the camera, a dot product of the vector that denotes where the camera is pointing, and the surface normal vector of the surface, is calculated. Often, 3D objects are split up into triangles with the points of each triangle vertex stored with coordinates x, y and z in a three element vector. The surface normals of each triangle are not usually pre-calculated. To find this surface normal, and thus whether the triangle faces the camera, a cross product operation is typically performed between two vectors that make up two sides of the triangle, using the following equation:

$$C \times T = \begin{vmatrix} \hat{x} & \hat{y} & \hat{z} \\ x_c & y_c & z_c \\ x_t & y_t & z_t \end{vmatrix} = \begin{matrix} \hat{x}(y_c z_t - y_t z_c) + \\ \hat{y}(x_t z_c - x_c z_t) + \\ \hat{z}(x_c y_t - x_t y_c) \end{matrix}$$

Conventionally, permuting elements of a vector has been performed using a permute instruction, which operates on a vector operand stored in a register in a register file, shuffles the elements of the vector operand, and stores the shuffled vector operand back into the same or a different register in the register file. Thus, a cross product may be computed by a conventional vector floating point multiply add pipeline by first performing several permute instructions to move the vector elements into the desired positions for the multiply, then performing a first set of multiplies, then a second set, and finally performing an add instruction with the multiply results. In order to move the vector elements into the proper positions for the first set of multiplies, the following permute instructions may be used:

[$x_t\, y_t\, z_t\, w_t$] permute1 => [$z_t\, x_t\, y_t\, w_t$]

[$x_c\, y_c\, z_c\, w_c$] permute2 => [$z_c\, x_c\, y_c\, w_c$]

$[x_t y_t z_t w_t]$ permute3 => $[y_t z_t x_t w_t]$ $[x_c y_c z_c w_c]$ permute4 => $[y_c z_c x_c w_c]$ If each element of each four element vector is labeled x, y, z and w, respectively, the vector elements are initially laid out in the vector register file in that order. The aforementioned permute instructions multiplex the elements into the different positions shown above in preparation for the multiply and add operations performed later. Of note, the permute1 and permute2 instructions specify the same word ordering as one another, as do the permute3 and permute4 instructions. Conventional permute instructions, however, operate on single vector operands, and as such, a separate permute instruction is required for each vector operand.

As noted above, a conventional permute instruction is processed by reading a vector operand from a register in a register file, shuffling the operand elements, and writing the result back into a register in the register file. The shuffling is performed within the execution pipeline using a set of multiplexers. A vector arithmetic instruction then reads the shuffled vector operand from the register file and performs the vector arithmetic.

The conventional approach, however, has a number of drawbacks. First, since the permute instruction writes back into the register file, it occupies valuable register file space that could be used for other temporary storage. Second, the permute instruction write back of the shuffled vector operand into the register file causes a "read after write" dependency hazard condition for the later vector arithmetic instruction, as the later instruction is required to wait for the permute instruction to fully flow through the pipeline until it can retrieve the shuffled vector operand from the register file, which causes the issue logic to stall newer dependant instructions until the permute result is ready. This stalling causes cycles to go unused in the pipeline where stages are not filled, and particularly for deeply pipelined execution units, performance can be significantly degraded.

Another approach for shuffling elements of vector operands relies on swizzle instructions. Conventional swizzle instructions may precede vector arithmetic instructions in an instruction stream to shuffle vector operand elements in an execution pipeline for subsequent processing by vector arithmetic instructions. Swizzle instructions have the benefit of not requiring shuffled operands to be written back to the register file prior to use, which reduces the number of registers being used, and avoids the read after write dependencies in the execution pipeline. However, conventional designs require a swizzle instruction to be issued before each arithmetic instruction that requires a custom word ordering, as each swizzle instruction only specifies the custom word ordering for the immediately subsequent arithmetic instruction in the instruction stream. The use of such instructions, however, has been found to unnecessarily swell the code size of instruction streams that use the same word ordering for multiple arithmetic instructions, and therefore also degrades performance. In the backface culling example discussed above, for example, four swizzle instructions would be required to implement the four permutes required to perform the calculation, irrespective of the fact that only two unique word orders were required.

A need therefore continues to exist in the art for a manner of optimizing the permutation of operand vectors in a vector execution unit.

SUMMARY OF THE INVENTION

The invention addresses these and other problems associated with the prior art by utilizing a software-accessible special purpose register architected into a processing unit in order to implement persistent vector multiplexer control of a vector-based execution unit. A persistent swizzle instruction is defined in an instruction set for the vector-based execution unit and is used to cause state information to be stored in the special purpose register such that the operand vectors processed by subsequent vector instructions executed by the vector-based execution unit will be selectively shuffled using the persisted state information. As a result, when multiple vector instructions require a common custom word ordering for one or more operand vectors, a single persistent swizzle instruction may be used to select the desired custom word ordering for all of the vector instructions.

Therefore, consistent with one aspect of the invention, a circuit arrangement includes processing logic configured to process instructions from an instruction stream, where the instructions in the instruction stream are selected from an instruction set that defines a vector instruction and a persistent swizzle instruction. The processing logic includes a register file including a plurality of vector registers configured to store operand vectors, where each operand vector includes a plurality of words, vector execution logic configured to retrieve operand vectors from the register file and process the retrieved operand vectors responsive to vector instructions received by the processing logic, and at least one software-accessible swizzle special purpose register architected into the processing logic and configured to store state information for use in selectively shuffling words from operand vectors retrieved by the vector execution logic in connection with processing vector instructions received by the processing logic. The circuit arrangement also includes swizzle logic coupled to the processing logic and configured to selectively shuffle words from operand vectors retrieved from the register file by the vector execution logic in connection with processing of the retrieved operand vectors by the vector execution logic. The swizzle logic is configured to, in response to a first persistent swizzle instruction received by the processing logic, persist state information for the swizzle logic in the at least one swizzle special purpose register, and to, in response to a plurality of vector instructions received by the processing logic subsequent to reception of the first persistent swizzle instruction by the processing logic, selectively shuffle words from operand vectors retrieved from the register file by the vector execution logic in connection with processing the plurality of vector instructions using the state information persisted in the at least one swizzle special purpose register.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
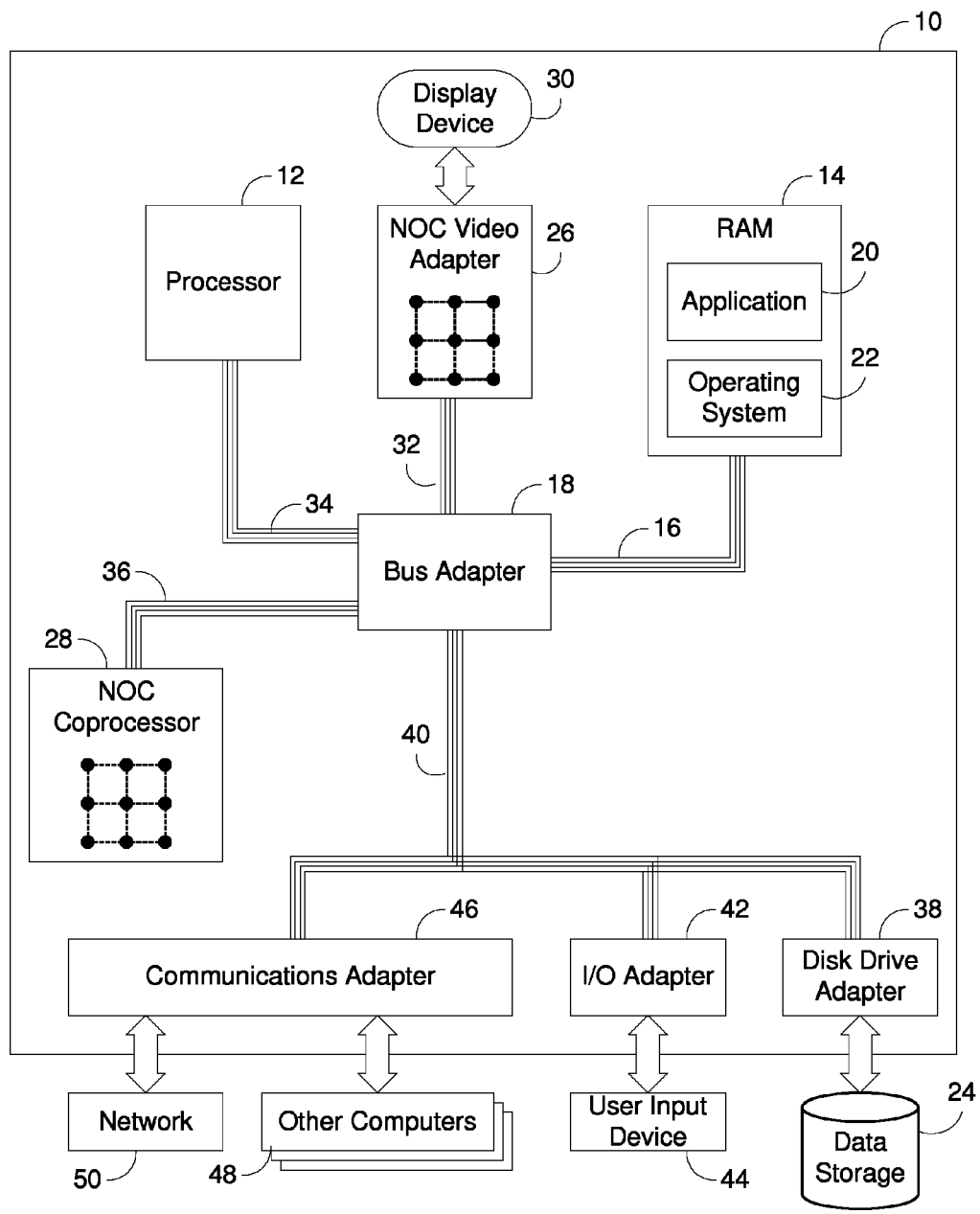
FIG. 1 is a block diagram of exemplary automated computing machinery including an exemplary computer useful in data processing consistent with embodiments of the present invention.

Embodiments consistent with the invention utilize persistent swizzle instructions to implement multiplexer control of a vector-based execution unit to facilitate the shuffling of words in one or more operand vectors processed by the execution unit.

In contrast with conventional pipelined permute type instructions that update an architected register in a register array, taking up valuable register resource and creating read after write dependencies, embodiments consistent with the invention utilize a persistent swizzle instruction to alter the internal multiplexer control states for a vector execution unit for subsequent instructions that are issued to the pipeline. The desired operand multiplexing is performed when subsequent instructions are executing, thus allowing multiple instructions to use the same operand multiplexing mode without a dependent permute or swizzle or multiplexer control instruction being issued for each subsequent instruction.

In one embodiment consistent with the invention, the multiplexer control state may reside internal to the vector execution unit in one or more storage elements that are desirably precluded from read access by software, so setting the state may incorporate less circuit delay and thus less instruction dependency stalling delay. In another embodiment consistent with the invention, however, a software-accessible special purpose register may be used to store the multiplexer control state. In such an embodiment, the software accessible nature of the special purpose register may allow for the multiplexer control state to be saved and restored by instructions in an interrupt handler, facilitating handling of flush conditions without the necessity for rollback.

A storage element consistent with the invention may be implemented as a latch or register, and may be maintained internal to a vector execution unit or may be maintained externally thereto elsewhere in a processing unit. Multiple storage elements may be used to store state information, and storage elements may be associated with particular threads in a multithreaded architecture. In addition, storage elements may be inaccessible to software executing on a processing unit, e.g., so that read access to the storage elements is precluded. Alternatively, storage elements may be software-accessible, such that software executing on a processing unit is able to read and/or write directly from or to such storage elements.

A persistent swizzle instruction consistent with the invention may be implemented as a dedicated instruction in an instruction set, and may include multiple instruction types, e.g., to set a custom word ordering based upon a value specified in the instruction itself, or based upon a value stored in a register referenced in the instruction. A persistent swizzle instruction may persist the selected word ordering for an unspecified duration, e.g., until a flush occurs and/or until the word ordering is modified by another persistent swizzle instruction, while in some embodiments, a persistent swizzle instruction may specify a particular duration, e.g., in terms of subsequent instructions, such that a default word order is restored after a predetermined number of subsequent instructions are processed by the vector execution unit. In addition, in some embodiments, e.g., where swizzle SPR's are used, a persistent swizzle instruction may not be a separate dedicated instruction, but may be implemented as a store or write instruction that identifies a register identifier associated with a particular swizzle SPR.

Other modifications will become apparent to one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
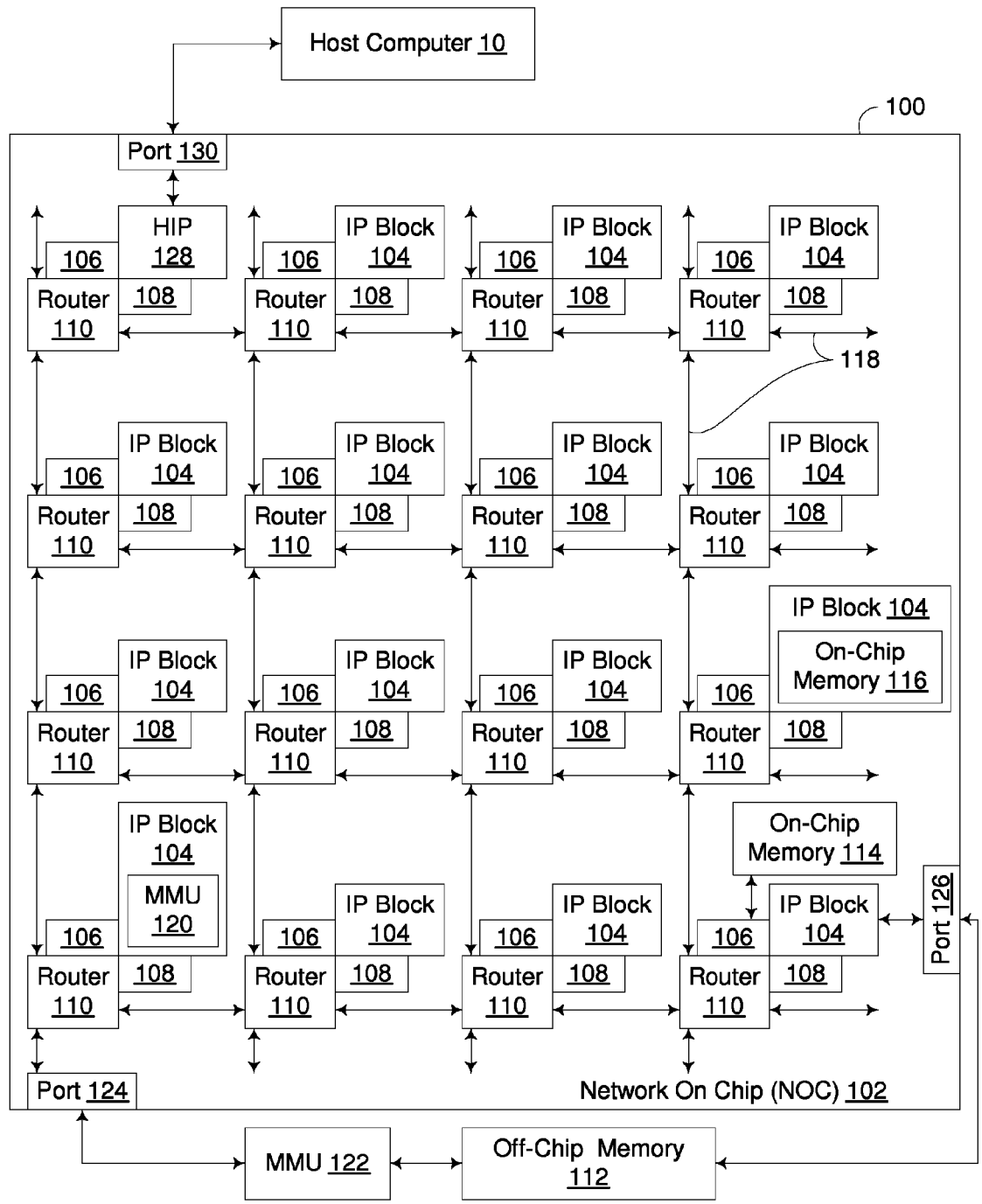
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
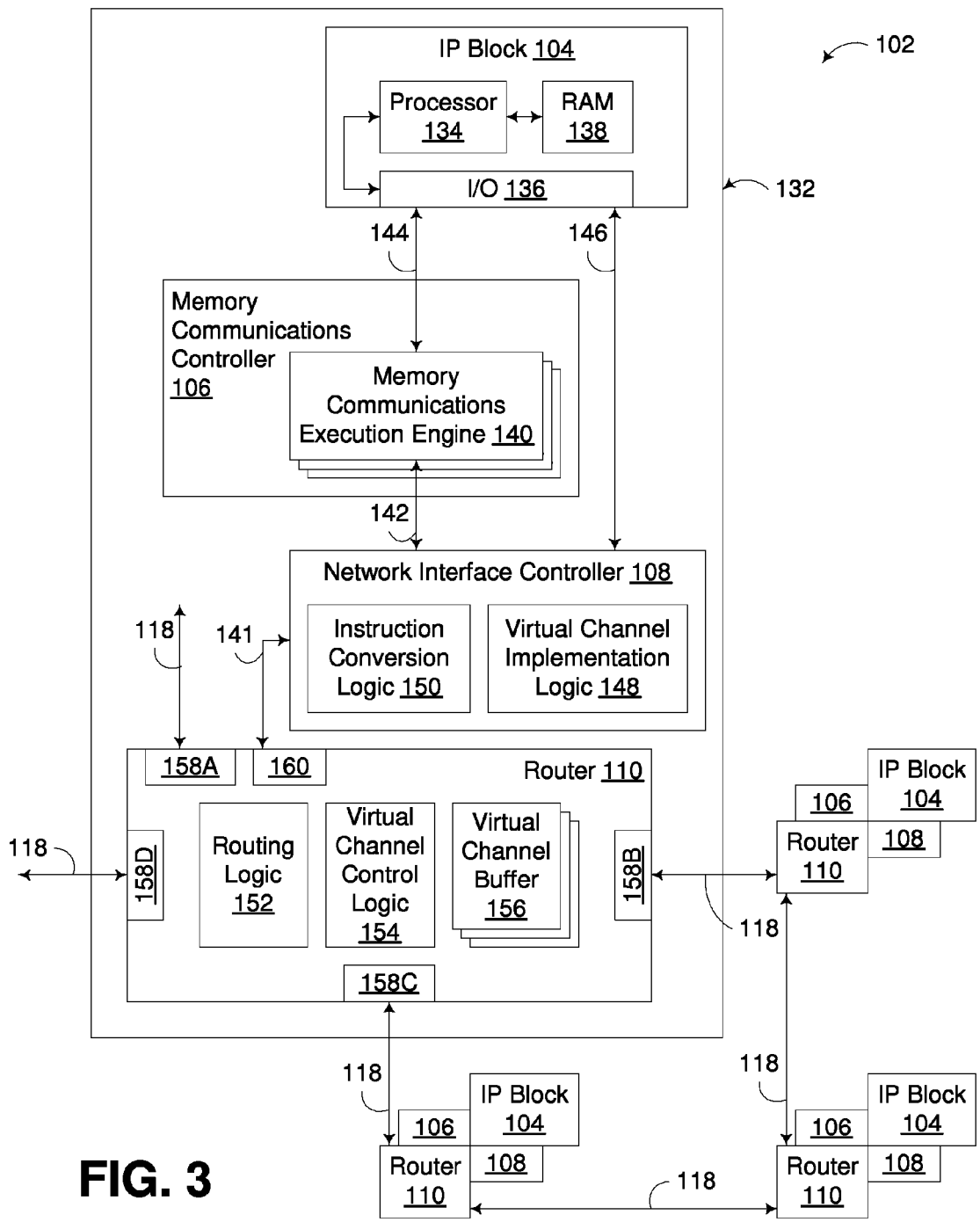
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
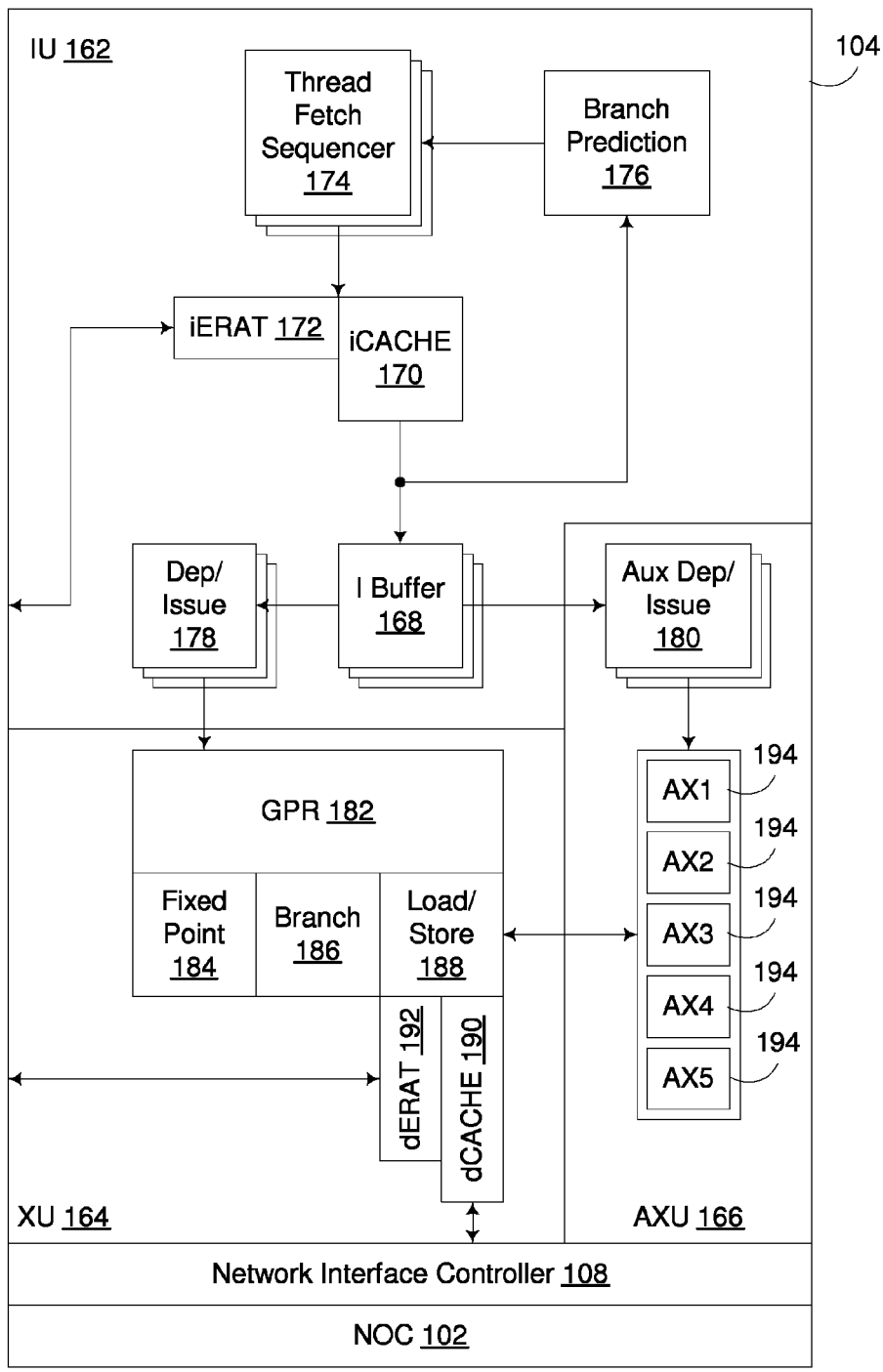
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Instruction-Based Persistent Multiplexer Control of Vector-Based Execution Unit

Figure 5:
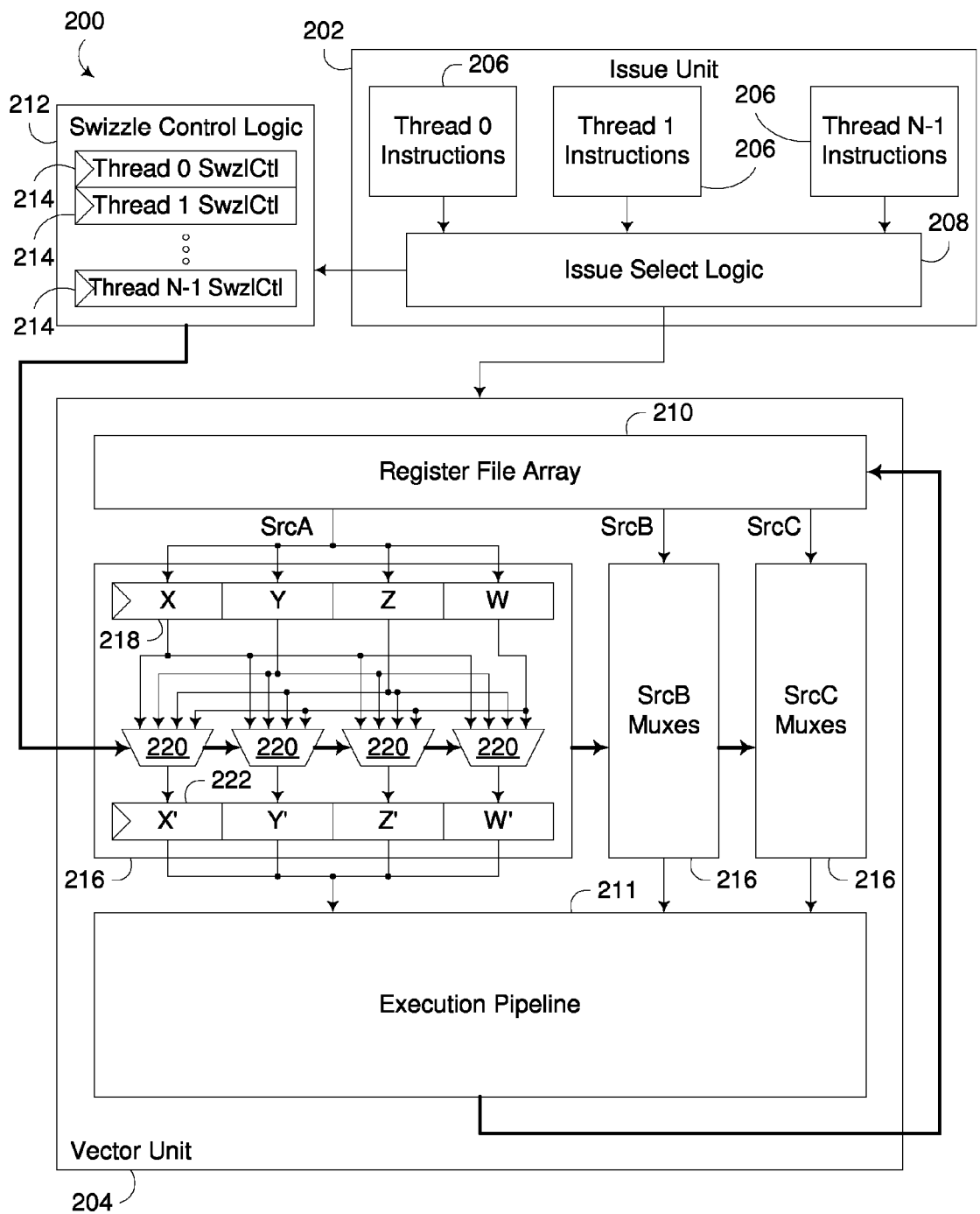
FIG. 5 is a block diagram of a processing unit incorporating instruction-based persistent multiplexer control consistent with the invention, and capable of being implemented within an IP block from the NOC of FIG. 2.

Turning now to FIG. 5, this figure illustrates an exemplary processing unit 200 capable of performing instruction-based persistent multiplexer control consistent with the invention. Processing unit 200 includes an issue unit 202 coupled to a vector unit 204 (also referred to herein as a vector-based execution unit), and may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Issue unit 202 is a multithreaded issue unit capable of receiving instructions from multiple (N) threads 206. Issue select logic 208 operates to schedule the issuance of instructions by the various threads, and issue unit 202 typically includes logic for managing dependencies between instructions, in a manner generally understood in the art. Issue select logic 208 outputs instructions to vector unit 204, which causes the vector unit to initiate execution of received instructions.

Vector unit 204 includes a register file 210 coupled to an execution pipeline 212. Register file 210 includes an array of vector registers, each of which including a plurality of words. For example, register file 210 may be implemented to support 4(quad)word vectors with 32 b-wide words, with 128 quad-word (128 b) vector registers. The 128 vector registers may be shared by threads 206, or in the alternative, may be partitioned to different threads, e.g., to provide each thread with a dedicated set of registers. Thus, for example, if four threads 206 are supported, register 210 may be organized to provide 32 128 b vector registers to each thread 206. It will be appreciated that different numbers of registers, partitions, words per vector and bits per word may be supported in different embodiments.

Execution pipeline 211, in response to instructions received from issue unit 202, performs mathematical, logical or other operations on one or more source operand vectors retrieved from selected vector registers in register file 210. For example, execution pipeline 211 may receive up to three source or operand vectors from register file 210, denoted as source operand vectors SrcA, SrcB and SrC in FIG. 5, and may store result data back into register file 210, e.g., in the form of a target vector written to a selected vector register in the register file. Execution pipeline 211 may include, for example, a plurality of processing lanes or sub-units capable of performing similar operations on different words of one or more operand vectors in parallel. For example, in the illustrated embodiment, if 4 word vectors are supported, execution pipeline 211 may include 4 processing lanes to process the 4 words of each vector in parallel. Vector unit 204 may be implemented as a number of different types of execution units, e.g., floating point units, fixed point units, or specialized execution units such as graphics processing units, encryption/decryption units, coprocessors, XML processing units, etc.

To implement instruction-based persistent multiplexer control, swizzle logic including swizzle control logic block 212, storage elements 214 and multiplexer logic blocks 216 is utilized in processing unit 200. Swizzle control logic block 212 is responsive to persistent swizzle instructions processed by issue select logic 208 to store state information in a plurality of thread-specific storage elements, or swizzle control latches, 214. The persisted state information is then fed to a plurality of multiplexer logic blocks 216 to selectively shuffle the words in operand vectors retrieved by vector unit 204 from register file 210. In the illustrated implementation, execution pipeline 210 is a multiply-add floating point pipeline that processes three operand vectors, denoted source vectors A, B and C, and the words in each source vector are passed to separate multiplexer logic blocks 216.

Within each multiplexer logic block 216 is an input latch 218, a set of multiplexers 220 and an output latch 222. For an N-word vector, N-word latches 218, 222 are used, as are N multiplexers 220. Each multiplexer 220 includes an output coupled to a respective word in output latch 220, as well as includes N inputs such that each word of the input latch 218 is fed to each multiplexer 220. Thus, with quad(4)word operand vectors, each latch 218, 220 includes storage for four words, and four 4-input multiplexers 220 are coupled between the latches.

Multiplexer select signals are provided by swizzle control logic 212 to control the routing of each word in the input latch 218 to a particular word in the output latch 222. While in the illustrated embodiment each word in the input latch is routed to one of the words in the output latch, in some embodiments particular words in the input latch may be duplicated and routed to multiple words of the output latch, whereby some words in the input latch may not be routed to any word of the output latch.

Multiplexers 220 function as word swapping multiplexers at the top of the arithmetic pipe described above, while swizzle control logic 212 functions as a state machine that, responsive to a persistent swizzle instruction, sets the multiplexer control state for each multiplexer 220 that remains constant until another persistent swizzle instruction sets the state to something else, or until a flush occurs. In a multi-threaded architecture such as shown in FIG. 5, for each thread in the processing unit, a separate swizzle control latch 214 is provided so that the multiplexers 220 are updated with the state information for the appropriate thread whenever an instruction from that thread is currently being executed in the vector unit 204.

In the illustrated embodiment, the default state information stored in each swizzle control latch 214, which is reset on power up, is the natural order of words in the quadword, i.e., for words x, y, z, w in an operand vector, the order x, y, z, w will be output from latch 216. If a persistent swizzle instruction has been issued from a particular thread and its associated swizzle control latches have been set with the data from that instruction, and following that an arithmetic instruction from a different thread is issued, that arithmetic instruction will use the state information associated with its own thread, not that of the most recently issued persistent swizzle instruction. If an arithmetic instruction is issued but no persistent swizzle instruction has been issued previously for that thread, the natural word order will be used.

In the illustrated embodiment, a persistent swizzle instruction may occupy the same amount of instruction memory as other instructions in the instruction set for the processing unit, e.g., 32 bits in a processing unit that processes 32 bit arithmetic instructions. Furthermore, a persistent swizzle instruction may be handled like a normal instruction during instruction caching, buffering, dependency stalling and issue. In the illustrated embodiment, at issue time, issue select logic 208 sets the state information in the associated swizzle control latch 214 for the thread, but the persistent swizzle instruction is not required to continue down the arithmetic pipeline or otherwise occupy a pipeline stage, such that an arithmetic instruction dependent on the swizzle may be issued very soon after its associated persistent swizzle instruction, compared to dependent arithmetic instructions.

Figure 6:
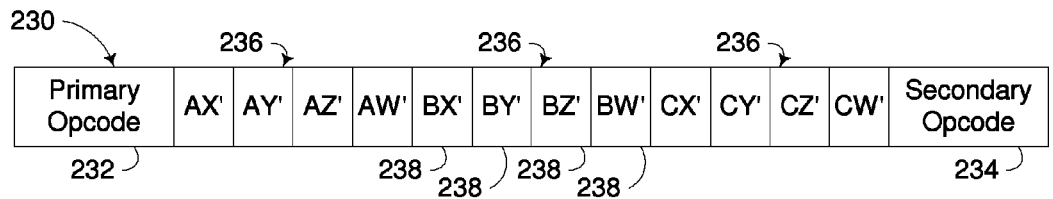
FIG. 6 is a block diagram of an exemplary persistent swizzle instruction format capable of being processed by the processing unit of FIG. 5.

FIG. 6, for example, illustrates an exemplary instruction format for a persistent swizzle instruction 230 consistent with the invention. In this implementation, instruction 230 includes a primary opcode field 232 and secondary opcode field 234 to respectively represent the primary and secondary opcodes for the instruction. A plurality of operand vector fields 236 (e.g., one each for the A, B and C operand vectors) are provided in the instruction, with each operand vector field 236 including a plurality of control bits that selectively shuffle each of the plurality of words in each operand vector. For example, each operand vector field 236 may includes a plurality of word-specific fields 238 that define the state information to be stored for each operand vector. In one embodiment, where each operand vector has N words, each operand vector field includes N word-specific fields, with each word-specific field including $\log_2 N$ bits that specify to which of N words each word should be shuffled. Consequently, for quad (4)word operand vectors, each operand vector field 236 may be 8 bits in length, composed of four word-specific fields of 2 bits each. The 2 bits per word-specific field are capable of routing a word from an operand vector to one of four possible words in the output latch.

Figure 7:
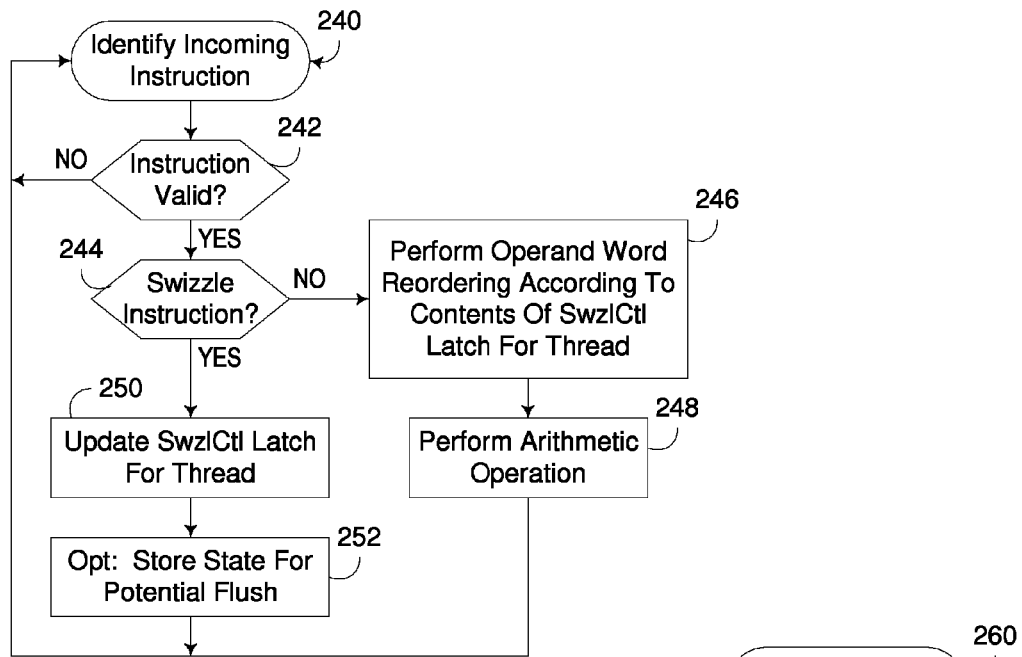
FIG. 7 is a flowchart illustrating an exemplary sequence of operations performed by the processing unit of FIG. 5 to implement instruction-based persistent multiplexer control consistent with the invention.

FIG. 7 illustrates at 240 an exemplary sequence of operations performed by processing unit 200 in processing instructions from an instruction stream. Upon receipt of an incoming instruction, a determination is made in block 242 as to whether the instruction is valid. If not, no further processing of the instruction is performed, and an error condition may optionally be signaled.

If the instruction is valid, however, control passes to block 244 to determine whether the instruction is a persistent swizzle instruction. If not, indicating that the instruction is an arithmetic instruction for execution by vector unit 204, control passes to block 246 to perform operand word reordering according to the contents of the swizzle control latch 214 for the associated thread. Control then passes to block 248 to perform the arithmetic operation requested by the instruction, and with the operand vectors reordered as specified in the swizzle control latch 214 for the thread. Processing of the instruction is complete.

Returning to block 244, if the instruction is a persistent swizzle instruction, control passes to block 250 to update the swizzle control latch 214 for the current thread, using the state information stored in the instruction. Processing of the instruction is then complete.

In addition, as shown in block 252, it may also be desirable in some circumstances to additionally take a snapshot of the current state of the processing unit in association with processing the persistent swizzle instruction. Particularly when each swizzle control latch 214 is not software accessible, flush operations that may be performed will typically require that a rollback occur to the last persistent swizzle instruction whenever the state is restored, to ensure that the state information for the persistent swizzle instruction can be restored prior to execution of any subsequent instructions that rely on that state information.

Figure 8:
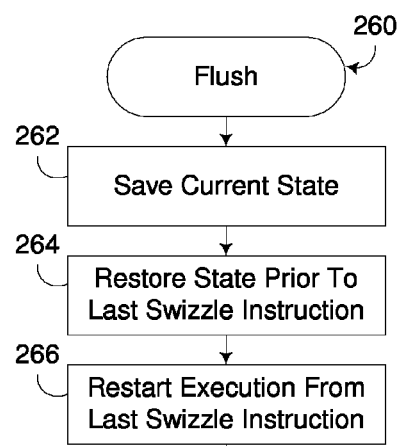
FIG. 8 is a flowchart illustrating an exemplary sequence of operations performed by the processing unit of FIG. 5 in connection with a flush operation.

Thus, for example, if a flush occurs due to a asynchronous interrupt (or any other flush reason) the state machine implemented in swizzle control logic 212 and the swizzle control latches 214 are reset to default state, and after the interrupt handler execution has completed, the processing unit resumes execution at or before the last persistent swizzle instruction to ensure that the persistent swizzle instruction that is associated with particular arithmetic instructions always retains that association. Furthermore, where the persistent swizzle instruction does not directly update any architected state that can be read by any software instructions, and no completed execution is reported to the flush control processing unit logic, the processing unit can typically be relied upon to always re-issue the persistent swizzle instruction after it has been flushed without encountering unpredictable results. Thus, as shown in FIG. 8, during the performance of a flush operation 260, the current state is saved at block 262, the state is restored to a point prior to the last swizzle instruction in block 264, and execution is restarted from (or before) the last persistent swizzle instruction in block 266.

Figure 9:
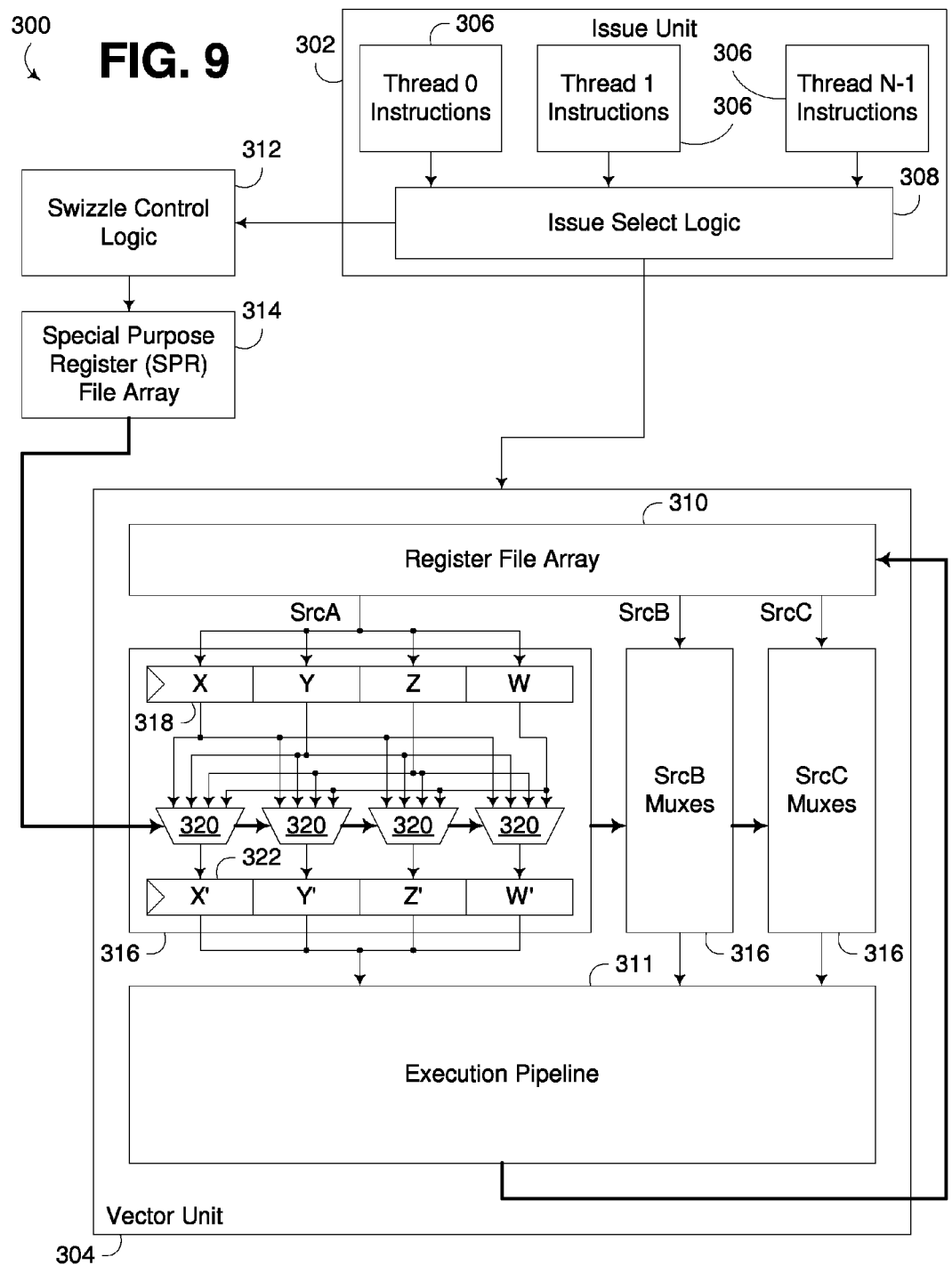
FIG. 9 is a block diagram of an alternate implementation of the processing unit of FIG. 5, utilizing a special purpose register file array to implement instruction-based persistent multiplexer control consistent with the invention.

In the implementation illustrated in FIGS. 5-8, a set of swizzle control latches, which are desirably not software accessible, are used to control the multiplexers for the purpose of instruction-based persistent multiplexer control. In alternate embodiments, however, it may be desirable to use software-accessible special purpose registers to store state information in lieu of non-accessible storage elements. FIG. 9, for example, illustrates an alternate processing unit 300, which includes an issue unit 302 coupled to a vector unit 304, which are respectively similar in configuration to issue unit 202 and vector unit 204 of processing unit 200 (FIG. 5). Issue unit 302 is a multithreaded issue unit capable of receiving instructions from multiple (N) threads 306, with issue select logic 308 used to schedule the issuance of instructions by the various threads. Vector unit 304 includes a register file 310 coupled to an execution pipeline 311.

To implement instruction-based persistent multiplexer control, swizzle logic includes a swizzle control logic block 312 and multiplexer logic blocks 316, the latter of which are similarly configured as multiplexer logic blocks 216 of processing unit 200. However, rather than non-accessible storage elements, the swizzle logic in processing unit 300 includes a special purpose register (SPR) file array 314 within which is stored a set of software-accessible swizzle SPR's that have been architected into processing unit 300.

The swizzle SPR's in SPR file array 314 typically store the same type of information as is stored in the swizzle control latches 214 of processing unit 200. However, the accessibility of the SPR's to software provide an advantage in terms of ease of configurability and facilitate the handling of flush conditions. Specifically, the software accessible nature of the SPR's may allow for the multiplexer control state to be saved and restored by instructions in an interrupt handler, which enables flush conditions to be handled safely. In such an embodiment, the state is persistent and consistent with the contents of the special purpose register until a flush occurs. After a flush, such as in the case of a timer interrupt to allow for time slice scheduling of multiple processes in an operating system, the multiplexer control behavior and the contents of the special purpose register will still be persistent and consistent, but the interrupt handler may save the contents of the special purpose register out to memory, so that the thread's state can be restored for proper operation later on. In addition, if the interrupt handler requires the use of vector instructions, the interrupt handler may need to set the contents of the swizzle special purpose register appropriately.

Figure 10:
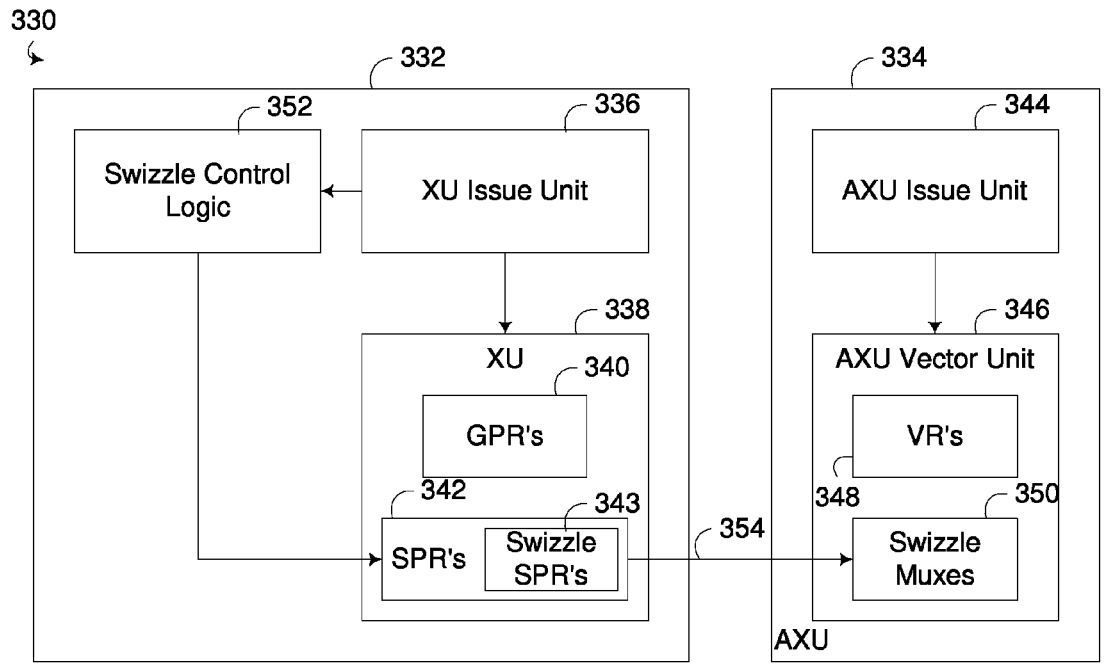
FIG. 10 is a block diagram of an alternate implementation of the processing unit of FIG. 9, where the special purpose register file array and a portion of the swizzle control logic is maintained in a fixed execution unit, and remote to the vector execution unit.

The swizzle SPR's 314 and the state machine for the swizzle logic may be disposed in different regions or components of a processing unit in different embodiments of the invention. For example, FIG. 10 illustrates an exemplary processing unit 330 similar to that implemented in IP block 104 of FIG. 4, incorporating a primary processing unit 332 coupled to an auxiliary execution unit (AXU) 334.

Primary processing unit 332 may include an issue unit 336 and an execution unit (XU) implemented as a fixed point execution unit 338. XU 338 is architected to include a set of general purpose registers (GPR's) 340 as well as a set of special purpose registers (SPR's) 342, of which several may be allocated as swizzle SPR's 343. AXU 334 operates as a vector floating point execution unit including a dedicated issue unit 344 and a vector unit 346, including a set of vector registers (VR's) 348 forming a register file for the vector unit.

To implement instruction-based multiplexer control, a set of swizzle multiplexers 350, configured in a similar manner to multiplexers 316 of processing unit 300, are disposed in the execution pipeline of vector unit 346. However, as shown in FIG. 10, both the swizzle SPR's 343 and at least a portion of the swizzle control logic 352 are disposed externally to AXU 334, and are logically incorporated into primary processing unit 332. A communications path 354 between swizzle SPR's 343 and swizzle multiplexers 350 is defined such that the state information maintained in the SPR's can be used to control the word ordering used by the AXU vector unit. By locating the SPR's and at least a portion of the swizzle control logic in primary processing unit 332, saves and restores of the SPR's during context switching operations is typically facilitated.

Figure 11:
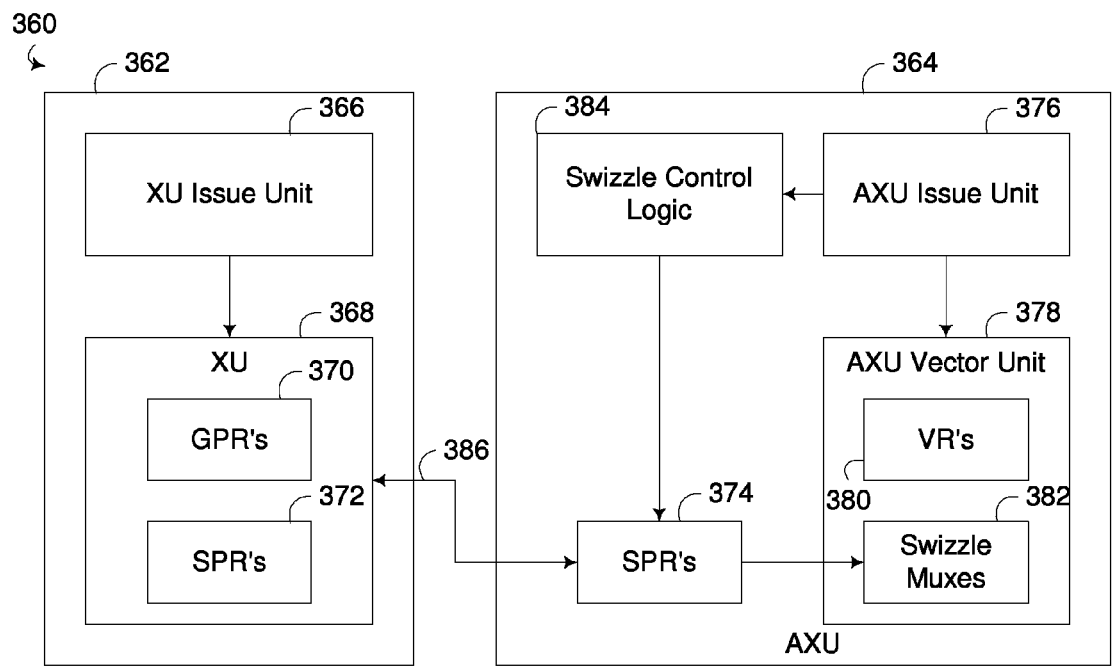
FIG. 11 is a block diagram of another alternate implementation of the processing unit of FIG. 9, where the special purpose register file array is maintained in a fixed execution unit, and remote to the vector execution unit.

On the other hand, it may be desirable in other embodiments to locate the swizzle SPR's and the bulk of the swizzle control logic in the AXU itself. FIG. 11, for example, illustrates an exemplary processing unit 360 similar to processing unit 330, incorporating a primary processing unit 362 coupled to an auxiliary execution unit (AXU) 364. Primary processing unit 362 may include an issue unit 366 and an execution unit (XU) implemented as a fixed point execution unit 368. XU 368 is architected to include a set of general purpose registers (GPR's) 370 as well as a set of special purpose registers (SPR's) 372. However, unlike processing unit 330, the swizzle SPR's in processing unit 360 are disposed in AXU 364 (block 374).

AXU 364 operates as a vector floating point execution unit including a dedicated issue unit 376 and a vector unit 378, including a set of vector registers (VR's) 380 forming a register file for the vector unit. To implement instruction-based multiplexer control in this embodiment, a set of swizzle multiplexers 382, configured in a similar manner to multiplexers 316 of processing unit 300, are disposed in the execution pipeline of vector unit 378. In addition, the swizzle SPR's 374 and the swizzle control logic 384 are disposed within the AXU 364, thus localizing the swizzle functionality in the AXU. A communications path 386, however, is still provided between swizzle SPR's 374 and XU 368 to enable the XU to perform saves and restores of the swizzle SPR's during context switching operations.

It will be appreciated that other manners of partitioning the swizzle logic, storage elements and/or swizzle SPR's among the components of a processing unit may be used in other implementations consistent with the invention. The invention is therefore not limited to the particular implementations disclosed herein.

Figure 12:
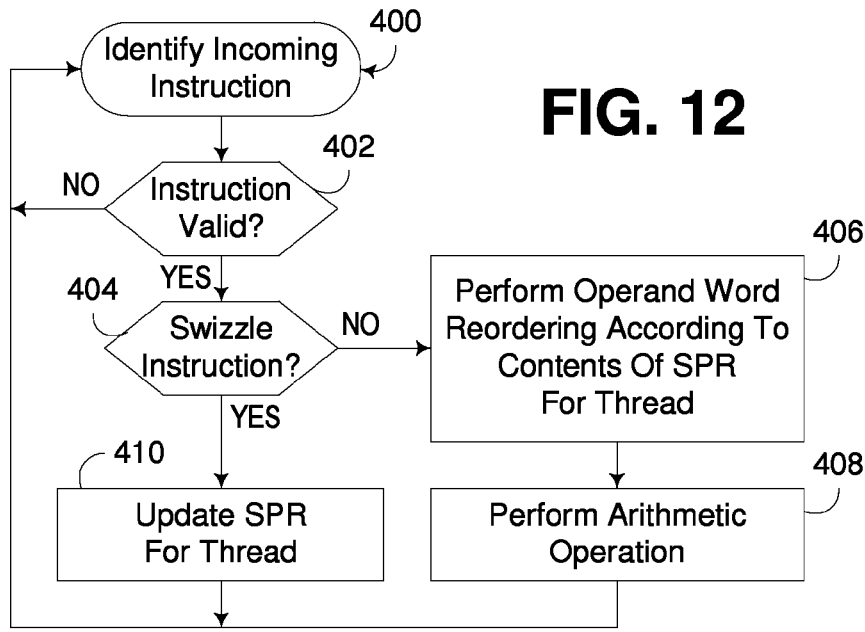
FIG. 12 is a flowchart illustrating an exemplary sequence of operations performed by the processing unit of FIG. 9 to implement instruction-based persistent multiplexer control consistent with the invention.

FIG. 12 next illustrates at 400 an exemplary sequence of operations performed by processing unit 300 of FIG. 9 in processing instructions from an instruction stream. Upon receipt of an incoming instruction, a determination is made in block 402 as to whether the instruction is valid. If not, no further processing of the instruction is performed, and an error condition may optionally be signaled. If the instruction is valid, however, control passes to block 404 to determine whether the instruction is a persistent swizzle instruction. If not, indicating that the instruction is an arithmetic instruction for execution by vector unit 304, control passes to block 406 to perform operand word reordering according to the contents of the swizzle special purpose register 314 for the associated thread. Control then passes to block 408 to perform the arithmetic operation requested by the instruction, and with the operand vectors reordered as specified in the swizzle SPR for the thread. Processing of the instruction is then complete. Returning to block 404, if the instruction is a persistent swizzle instruction, control passes to block 410 to update the swizzle SPR 314 for the current thread, using the state information stored in the instruction. Processing of the instruction is then complete.

It may be desirable in some embodiments to specify a duration within a persistent swizzle instruction, such that the custom word ordering specified by the instruction expires after a predetermined duration, e.g., after a predetermined number of subsequent arithmetic instructions. Thus, for example, a persistent swizzle instruction could specify that the custom word ordering in the instruction be persisted for the next 3 instructions, whereby the subsequent three instructions in the instruction stream would be processed using the specified custom word ordering. Then, once the duration had been reached, the word ordering for the thread would be restored to the default ordering.

Figure 13:
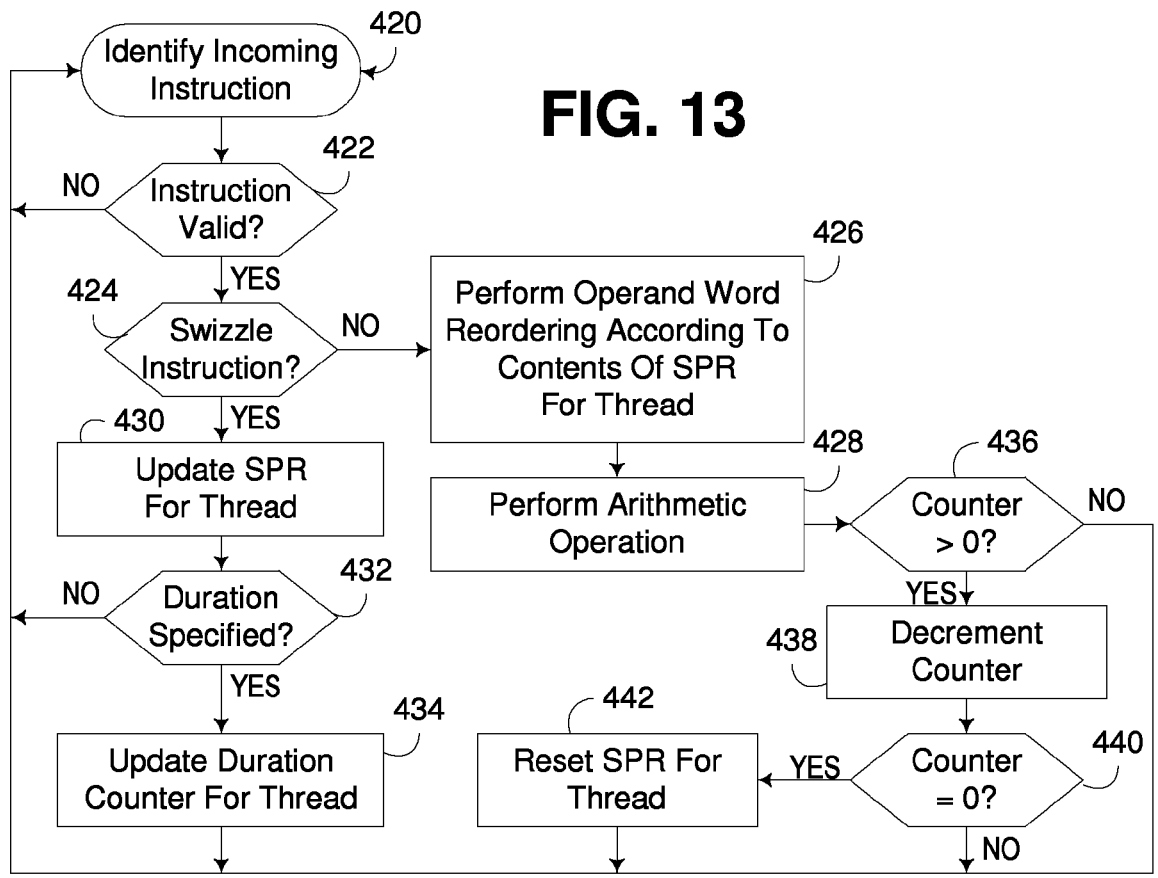
FIG. 13 is a flowchart illustrating an exemplary sequence of operations performed by the processing unit of FIG. 9 to implement instruction-based persistent multiplexer control consistent with the invention, with additional support for duration limited persistent swizzle instructions.

FIG. 13 illustrates at 420 another exemplary sequence of operations performed by processing unit 300 in processing instructions from an instruction stream, including support for duration-limited persistent swizzle instruction. In this embodiment, upon receipt of an incoming instruction, a determination is made in block 422 as to whether the instruction is valid. If not, no further processing of the instruction is performed, and an error condition may optionally be signaled. If the instruction is valid, however, control passes to block 424 to determine whether the instruction is a persistent swizzle instruction. If not, indicating that the instruction is an arithmetic instruction for execution by vector unit 304, control passes to block 426 to perform operand word reordering according to the contents of the swizzle special purpose register 314 for the associated thread. Control then passes to block 428 to perform the arithmetic operation requested by the instruction.

Returning to block 424, if the instruction is a persistent swizzle instruction, control passes to block 430 to update the swizzle SPR 314 for the current thread, using the state information stored in the instruction. Block 432 then determines whether a duration has been specified in the persistent swizzle instruction. If not, processing of the instruction is complete. On the other hand, if a duration is specified, block 432 passes control to block 434 to update a duration counter for the thread based upon that specified in the persistent swizzle instruction. The duration counter may be maintained, for example, in an SPR or in other storage elements coupled to the swizzle logic. Once the duration counter is set, processing of the instruction is complete.

Returning to block 428, once the arithmetic operation specified by a non-swizzle instruction is performed in block 428, blocks 436-442 update the duration counter and determine whether to continue to persist the state information maintained for the current thread in the swizzle SPR. Specifically, block 436 determines whether the duration counter for the thread is greater than zero. If not, no duration has been specified, so processing of the instruction is complete. Otherwise, if the duration counter is greater than zero, block 436 passes control to block 438 to decrement the counter. Block 440 then determines if the decremented counter is equal to zero. If not, the current state information for the thread should be maintained for at least one more instruction, so processing of the instruction is complete. Otherwise, if the duration counter is now zero, block 440 passes control to block 442 to reset the swizzle SPR for the current thread to the default state, and processing of the instruction is complete.

Returning now to the cross product example above, where four permute operations are conventionally required, with two of the four permute operations sharing a first custom word ordering, and the other two of the four permute operations sharing a second custom word ordering, it will be appreciated that the two unique custom word orderings required for the cross product may be implemented using two persistent swizzle instructions, with those arithmetic instructions using the custom word orderings following the respective swizzle instructions in the instruction stream. In contrast to the use of permute instructions, additional vector registers are not required to store the shuffled operand vectors back into the register file, nor are read-write dependencies introduced to stall the arithmetic operations until the shuffled operand vectors have been written back into the register file. In addition, in contrast to convention, non-persistent swizzle instructions, half the number of swizzle instructions are required, thus reducing the number of instructions in the instruction stream.

It will be appreciated that various additional modifications may be made without departing from the spirit and scope of the invention. For example, alternative logic circuits to the specific arrangements of multiplexers shown herein may be used to selectively shuffle words from an operand vector. Furthermore, selective shuffling of operand words may occur at various stages in an execution pipeline, and may be combined with other execution logic so that other operations are performed within the same stage of the pipeline.

Other modifications will be apparent to one of ordinary skill in the art having the benefit of the instant disclosure. Therefore, the invention lies in the claims hereinafter appended.

What is claimed is:

1. A circuit arrangement, comprising:
   processing logic configured to process instructions from an instruction stream, wherein the instructions in the instruction stream are selected from an instruction set that defines a vector instruction and a persistent swizzle instruction, and wherein the processing logic includes:
   a register file including a plurality of vector registers configured to store operand vectors, wherein each operand vector includes a plurality of words;
   vector execution logic configured to retrieve operand vectors from the register file and process the retrieved operand vectors responsive to vector instructions received by the processing logic; and
   at least one software-accessible swizzle special purpose register architected into the processing logic and configured to store state information for use in selectively shuffling words from operand vectors retrieved by the vector execution logic in connection with processing vector instructions received by the processing logic; and
   swizzle logic coupled to the processing logic and configured to selectively shuffle words from operand vectors retrieved from the register file by the vector execution logic in connection with processing of the retrieved operand vectors by the vector execution logic, wherein the swizzle logic is configured to, in response to a first persistent swizzle instruction received by the processing logic, persist state information for the swizzle logic in the at least one swizzle special purpose register, and wherein the swizzle logic is configured to, in response to a plurality of vector instructions received by the processing logic subsequent to reception of the first persistent swizzle instruction by the processing logic, selectively shuffle words from operand vectors retrieved from the register file by the vector execution logic in connection with processing the plurality of vector instructions using the state information persisted in the at least one swizzle special purpose register such that at least two vector instructions received by the processing logic subsequent to the first persistent swizzle instruction are processed using operand vectors selectively shuffled according to the state information persisted in the at least one swizzle special purpose register.

2. The circuit arrangement of claim 1, wherein the processing logic is configured to execute instruction streams from a plurality of threads, wherein the at least one swizzle special purpose register comprises a plurality of swizzle special purpose registers, wherein each special purpose register is associated with one of the plurality of threads, wherein the swizzle logic is configured to, in response to a persistent swizzle instruction associated with a first thread among the plurality of threads, persist thread-specific state information in a first swizzle special purpose register among the plurality of swizzle special purpose registers that is associated with the first thread, and wherein the swizzle logic is configured to, in response to a first vector instruction associated with the first thread, selectively shuffle words from a first operand vector retrieved from the register file by the vector execution logic using the state information persisted in the first swizzle special purpose register.

3. The circuit arrangement of claim 1, wherein each operand vector includes N words, wherein the swizzle logic comprises N multiplexers, wherein each multiplexer includes N inputs, an output, and a select input, wherein the swizzle logic is configured to selectively shuffle words by selectively asserting the select inputs of the N multiplexers.

4. The circuit arrangement of claim 3, wherein the N multiplexers are disposed intermediate of first and second stages in an execution pipeline, wherein the first and second stages respectively include first and second stage latches, wherein each stage latch includes N words, wherein the N inputs of each multiplexer are coupled respectively to receive the N words from the first stage latch, and wherein the N words from the second stage latch are respectively coupled to receive the outputs of the N multiplexers.

5. The circuit arrangement of claim 1, wherein the vector execution logic comprises a pipelined vector floating point execution unit.

6. The circuit arrangement of claim 1, wherein the persistent swizzle instruction includes an opcode field and a plurality of operand vector fields, each operand vector field including a plurality of control bits that selectively shuffle each of the plurality of words in each operand vector.

7. The circuit arrangement of claim 6, wherein each operand vector includes N words, wherein the plurality of control bits in each operand vector field includes N word-specific fields, each word-specific field including $\log_2 N$ bits that specify to which of N words each word should be shuffled.

8. The circuit arrangement of claim 7, wherein the vector execution logic comprises a floating point unit configured to operate on up to three vector operands, wherein each operand vector includes four words, wherein the persistent swizzle instruction includes three operand vector fields, and wherein each operand vector field includes four word-specific fields, each of which including two bits.

9. The circuit arrangement of claim 1, wherein the swizzle logic is further configured to persist the swizzle special purpose register in response to a flush of the vector execution logic.

10. The circuit arrangement of claim 1, wherein the at least one swizzle special purpose register is configured to be initialized to a default word order wherein the plurality of words from each operand vector are unshuffled.

11. The circuit arrangement of claim 1, wherein the first persistent swizzle instruction specifies a duration, and wherein the swizzle logic is configured to reset the at least one swizzle special purpose register after expiration of the specified duration.

12. The circuit arrangement of claim 11, wherein the duration includes a selected number of instructions, and wherein the swizzle logic is configured to reset the at least one swizzle special purpose register in response to execution of the specified number of instructions subsequent to the first persistent swizzle instruction.

13. The circuit arrangement of claim 1, wherein the swizzle logic is configured to persist the state information in the swizzle special purpose register such that each vector instruction executed subsequent to the first persistent swizzle instruction will use the persisted state information until a second persistent swizzle instruction is received or a flush occurs.

14. An integrated circuit device including the circuit arrangement of claim 1.

15. A program product comprising a computer readable non-transitory storage medium and logic definition program code resident on the computer readable medium and defining the circuit arrangement of claim 1.

16. A method of operating a processing unit of the type including vector execution logic configured to retrieve multiword operand vectors from a register file and process the retrieved operand vectors responsive to vector instructions from an instruction stream, the method comprising:
  in response to a first plurality of vector instructions received by the processing unit, selectively shuffling words from operand vectors retrieved from the register file by the vector execution logic in connection with processing the first plurality of vector instructions using first state information persisted in at least one software-accessible swizzle special purpose register;
  in response to a persistent swizzle instruction received by the processing unit subsequent to receiving the first plurality of vector instructions, persisting second state information in the at least one swizzle special purpose register; and
  in response to a second plurality of vector instructions received by the processing unit subsequent to receiving the persistent swizzle instruction, selectively shuffling words from operand vectors retrieved from the register file by the vector execution logic in connection with processing the second plurality of vector instructions using the second state information persisted in the at least one swizzle special purpose register such that at least two vector instructions received by the processing unit subsequent to the persistent swizzle instruction are processed using operand vectors selectively shuffled according to the state information persisted in the at least one swizzle special purpose register.

17. The method of claim 16, wherein the processing unit is configured to execute instruction streams from a plurality of threads, wherein the at least one swizzle special purpose register comprises a plurality of swizzle special purpose registers, wherein each swizzle special purpose register is associated with one of the plurality of threads, the method further comprising:

in response to a persistent swizzle instruction associated with a first thread among the plurality of threads, persisting thread-specific state information in a first swizzle special purpose register among the plurality of swizzle special purpose registers that is associated with the first thread; and in response to a first vector instruction associated with the first thread, selectively shuffling words from a first operand vector retrieved from the register file by the vector execution logic using the state information persisted in the first swizzle special purpose register.

18. The method of claim 16, wherein the persistent swizzle instruction includes an opcode field and a plurality of operand vector fields, each operand vector field including a plurality of control bits that selectively shuffle each of the plurality of words in each operand vector.

19. The method of claim 18, wherein each operand vector includes N words, wherein the plurality of control bits in each operand vector field includes N word-specific fields, each word-specific field including $\log_2 N$ bits that specify to which of N words each word should be shuffled.

20. The method of claim 19, wherein the vector execution logic comprises a floating point unit configured to operate on up to three vector operands, wherein each operand vector includes four words, wherein the persistent swizzle instruction includes three operand vector fields, and wherein each operand vector field includes four word-specific fields, each of which including two bits.

21. The method of claim 16, further comprising persisting the swizzle special purpose register in response to a flush of the vector execution logic.

22. The method of claim 16, wherein the first persistent swizzle instruction specifies a duration, the method further comprising resetting the at least one swizzle special purpose register after expiration of the specified duration.

23. The method of claim 22, wherein the duration includes a selected number of instructions, and wherein resetting the at least one swizzle special purpose register includes resetting the at least one swizzle special purpose register in response to execution of the specified number of instructions subsequent to the first persistent swizzle instruction.

24. The method of claim 16, further comprising persisting the state information in the swizzle special purpose register such that each vector instruction executed subsequent to the first persistent swizzle instruction will use the persisted state information until a second vector persistent swizzle instruction is received or a flush occurs.

* * * * *